(12) United States Patent
Watanabe

(10) Patent No.: US 6,862,839 B2
(45) Date of Patent: Mar. 8, 2005

(54) ATTRACTING MITE CONFIRMATION APPARATUS AND MITE CAPTURING METHOD THEREOF

(76) Inventor: Hideo Watanabe, 13-51 Minaminu-machi, Kitahiranu, Himezi-shi, Hyogo (JP)

( * ) Notice: Subject to any disclaimer, the term of this patent is extended or adjusted under 35 U.S.C. 154(b) by 28 days.

(21) Appl. No.: 10/369,591

(22) Filed: Feb. 21, 2003

(65) Prior Publication Data
US 2003/0159324 A1 Aug. 28, 2003

(30) Foreign Application Priority Data

Feb. 22, 2002 (JP) ........................................ 2002-045614

(51) Int. Cl.$^7$ ............................................... A01M 1/14
(52) U.S. Cl. ...................................................... 43/114
(58) Field of Search ........................... 43/114, 115, 116

(56) References Cited

U.S. PATENT DOCUMENTS

| | | | | |
|---|---|---|---|---|
| 1,850,763 A | * | 3/1932 | Morley | 43/107 |
| 2,177,670 A | * | 10/1939 | Peirson | 43/107 |
| 4,217,722 A | * | 8/1980 | McMullen | 43/114 |
| 4,782,622 A | * | 11/1988 | Roberts | 43/131 |
| 4,890,416 A | * | 1/1990 | Roberts | 43/131 |
| 5,673,509 A | * | 10/1997 | Gatewood, Jr. | 43/58 |
| 5,737,870 A | * | 4/1998 | Thind | 43/107 |
| 5,930,945 A | * | 8/1999 | Glenister et al. | 43/121 |
| 6,158,443 A | * | 12/2000 | Leman et al. | 132/120 |
| 6,280,048 B1 | * | 8/2001 | Luquire | 362/125 |
| 6,404,565 B2 | * | 6/2002 | Russell | 359/804 |
| 6,415,545 B1 | | 7/2002 | Watanabe | |
| 6,618,983 B1 | * | 9/2003 | Spragins | 43/107 |

FOREIGN PATENT DOCUMENTS

| | | | | |
|---|---|---|---|---|
| DE | 3209196 A1 | * | 10/1983 | A01M/1/02 |
| DE | 19808745 A1 | * | 9/1999 | A01M/1/10 |
| JP | 64-56674 U | | 4/1989 | |
| JP | 2-215705 A | | 8/1990 | |
| JP | 3-48474 U | | 5/1991 | |

* cited by examiner

Primary Examiner—Peter M. Poon
Assistant Examiner—Bethany L. Griles
(74) Attorney, Agent, or Firm—Birch, Stewart, Kolasch & Birch, LLP

(57) ABSTRACT

An apparatus for attracting mites that to it possible to easily and practically confirm the presence of mites, which are allergenic sources in houses, by the naked eye. A see-through portion is provided so that mites attracted to a mite attracting sheet for attracting mites can be confirmed. The mite attracting sheet desirably has an opposite color to a body color of mites, namely, black, brown, dark blue or the like so that attracted mites can be easily confirmed. Moreover, by disposing an insecticidal sheet on the sheet for attracting vermin such as mites and insects harmful to fabric, attracted mites, etc., can be captured and destroyed.

18 Claims, 5 Drawing Sheets

(a)

(b)

(a)

(b)

ATTRACTING MITE CONFIRMATION APPARATUS AND MITE CAPTURING METHOD THEREOF

This nonprovisional application claims priority under 35 U.S.C. § 119(a) on Patent Application No. 2002-045614 filed in JAPAN on Feb. 22, 2002, which is herein incorporated by reference.

BACKGROUND OF THE INVENTION

1. Field of the Invention

The present invention relates to an attracting mite confirmation apparatus whereby mites as a target of parasite extermination in the hygienic field can be observed and a mite capturing method thereof.

2. Description of the Prior Art

With the proliferation of mites in indoor carpets, straw mats, mattresses, beds, rugs, automobile fabrics, etc. in modern home environments, such mites are increasingly being implicated as the cause of atopic dermatitis, bronchial asthma and similar conditions.

As living styles become more Westernized, to include sashes and the like, environments are being provided that are more ideal for mites to live in and the proliferation of mites is promoted, such that it is becoming a major issue to deal with these health-threatening mites.

Methods for elimination of mites that have been proposed include the extermination of mites by spraying miticides that are chemical pesticides containing mixtures of petroleum-based chemical substances, and capturing mites using attractants.

Conventional miticides, however, are highly toxic and the extermination of mites by spraying of such chemicals has the side-effect of polluting the inhabited environment while also posing a risk for children and infants. They cannot be used on beddings, and therefore the mites are left undisturbed in their main living sites. In addition, cheletidaes and acarid mites are virtually unaffected by pesticides, and there has been no means of capturing and exterminating all such types of mites.

Therefore, the present inventor has developed a mite attracting catcher for capturing mites by disposing a mite attracting and capturing agent on a mat-like or sheet-like catcher made of cotton, knitted fabric, or cloth, and has provided the same on the market. As a result, without involving contamination of a residential environment, a state where mites easily approach could be provided and a large variety of mites (acaridan) could be attracted and captured in large numbers.

In particular, by providing the mite attracting agent as a non-toxic mite-killing substance, allergens of dead mite shells, excrement, etc., could be eliminated without damaging a residential environment.

Nevertheless, even when a large variety of and a large number of mites of allergens could be captured by the mite catcher, since mites are minute on a micron order, these are hardly recognized by the naked eye. Therefore, the present inventor has received a large number of inquiries/demands such that, "Do mites really exist in my residence?," "What types of mites exist?," "I would like to see the captured mites even once with my own eyes."

SUMMARY OF THE INVENTION

In view of the above-described circumstances, in order to solve the above problems, it is a first object of the present invention to provide an attracting mite confirmation apparatus comprising: a see-through portion so that mites attracted to a mite attracting sheet can be confirmed.

In such a manner, mites can be attracted by the mite attracting sheet and the mites can be observed through the see-through portion, therefore, what types of and what quantity of mites have been in homes, etc., can be understood through a hands-on experience, countermeasures against mites can be seriously considered, and mite allergens can be destroyed.

It is another object of the present invention to provide an attracting mite confirmation apparatus, wherein a see-through portion of a transparent sheet is overlapped with the mite attracting sheet, and the mite attracting sheet has an opposite color to a body color of mites, such as black, brown, dark blue or the like so that attracted mites can be easily confirmed. Accordingly, attracted mites can be easily observed via the see-through portion.

It is still another object of the present invention to provide an attracting mite confirmation apparatus, wherein a see-through portion of a transparent sheet is overlapped on both sides of the mite attracting sheet. Accordingly, attracted mites can be confirmed from both-surface sides of the see-through portions, and even when mites crawl downward, the mites can be easily confirmed by turning over the attracting mite confirmation apparatus.

In addition, it is still another object of the present invention to provide an attracting mite confirmation apparatus, wherein the mite attracting sheet is replaceably fitted to a base sheet. Accordingly, the attracting mite confirmation apparatus can be repeatedly used by only a replacement of the mite attracting sheet.

Moreover, it is another object of the present invention to provide an attracting mite confirmation apparatus, wherein a loupe of required magnification is fitted to an upper part of the see-through portion of a see-through window so that attracted mites can be observed by the naked eye. Accordingly, attracted mites can be promptly confirmed via the loupe.

Moreover, it is another object of the present invention to provide an attracting mite confirmation apparatus, wherein by fitting an attractive mite-killing sheet to which an attractive mite-killing agent for attracting and capturing mites has been applied is fitted so as to be replaceable with a mite attracting sheet, attracted mites can be confirmed and captured. Accordingly, attracted mites can be observed and attracted mites can be captured and processed for destruction.

Moreover, it is another object of the present invention to provide an attracting mite confirmation apparatus in which by adhering a mite attracting sheet for attracting mites to a see-through body of a transparent cylindrical body or thin case having an opening through which mites can intrude or by providing the same inside, mites attracted to the mite attracting sheet can be confirmed through the see-through body of a transparent cylindrical body or thin case. Accordingly, the attracting mite confirmation apparatus can be easily placed, and attracted mites can be easily confirmed.

Furthermore, it is another object of the present invention to provide an attracting vermin capturing method comprising the steps of: providing a see-through portion for confirming vermin such as mites, attracted to an attracting sheet for attracting vermin such as mites and attracting mites, etc., to the attracting sheet; and fitting, after confirming the attracted mites, etc., via the see-through portion, an attractive insecticidal sheet to which an attractive insecticide to capture and destroy the mites, etc., has been applied to an attracting vermin confirmation apparatus, thereby capturing and destroying the mites, etc. Accordingly, anyone can confirm vermin such as mites in his/her residence with his/her own eyes, and he/she can easily carry out a check for vermin such as mites in his/her own house and can eliminate mites, etc., whereby mite allergens, etc., can be eliminated.

Other features of the present invention will be explained by the following descriptions.

DETAILED DESCRIPTION OF THE PREFERRED EMBODIMENTS

An attracting mite confirmation apparatus of the present invention characteristically comprises a see-through portion so that mites attracted to a mite attracting sheet for attracting mites can be confirmed.

Figure 1:
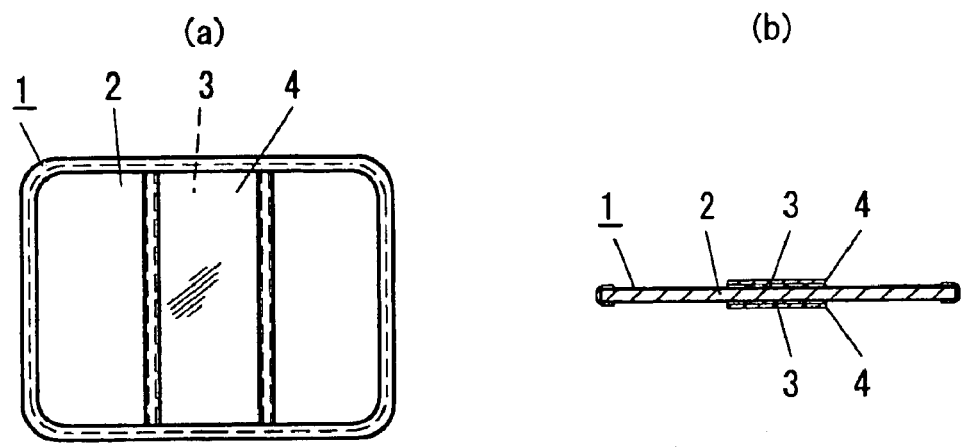
FIG. 1 shows a plan view (a) and a sectional side view (b) of an attracting mite confirmation apparatus of an embodiment of the present invention.
Figure 2:
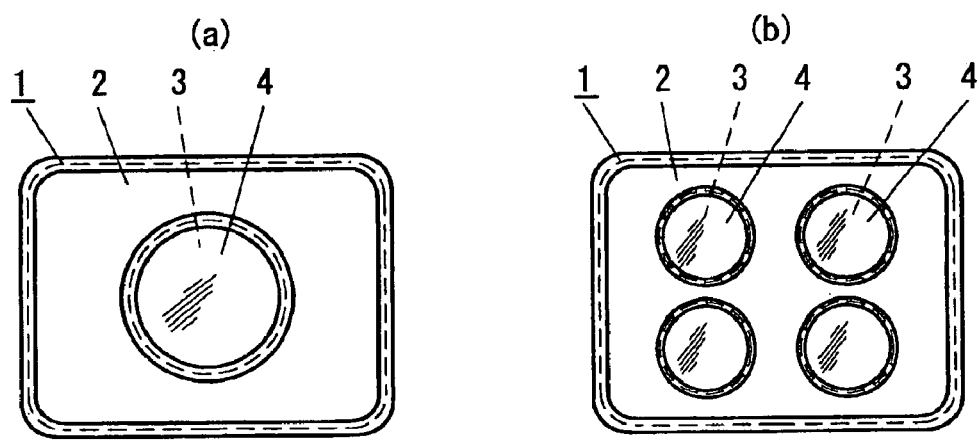
FIG. 2 shows plan views (a) and (b) of other embodiments of the same.
Figure 3:
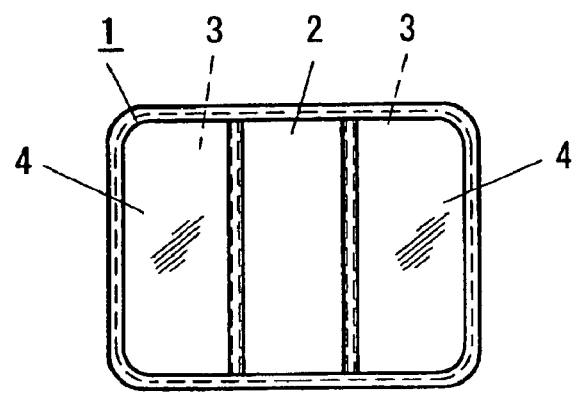
FIG. 3 shows plan views of still other embodiments of the same.

A mite confirmation apparatus 1 is constructed such that, as shown in FIG. 1 through FIG. 3, a mite attracting sheet(s) 3 is laminated on one surface side or both surface sides of the upper surface and lower surface of a base 2, a transparent sheet(s) 4 is disposed in an overlapping manner with the mite attracting sheet(s) 3, so that mites attracted to the mite attracting sheet(s) 3 can be confirmed through the see-through portion 4 of a transparent sheet or the like by the naked eye or a loupe.

As the base 2, an appropriate sheet, mat, thin case, cylindrical body or the like of paper, fabric, nonwoven fabric, resin or the like can be utilized, and the mite attracting sheet 3 can be made to serve as a base 2, as the case may be.

As the mite attracting sheet 3, a sheet with air permeability such as Japanese paper, nonwoven fabric, cotton fabric where mites can intrude and move can be utilized, and by applying a mite attracting agent to this mite attracting sheet 3, mites are attracted.

Then, on the front-surface side of this mite attracting sheet 3, a see-through portion 4 of a transparent synthetic resin film, sheet, or case, as the case may be, a glass sheet, a tumbler-like cylindrical body or the like is disposed in a covering manner so that mites attracted to the mite attracting sheet 3 can be observed in a captured condition between the mite attracting sheet 3 and see-through portion 4 by the naked eye via a loupe of required magnification, etc. As the above see-through portion 4, one or a plurality of see-through portions 4 can be provided on the whole surface, or, as shown in FIG. 1 to FIG. 3, on the central part, both side parts, or other parts of one surface or both surfaces of the mite attracting sheet(s) 3, and in order to easily observe mites that are white or of a nearly transparent color, the mite attracting sheet 3 below this rectangular or circular transparent window-like see-through portion 4 preferably has an opposite color to the body color of mites, such as black, brown, or dark blue. In particular, the see-through portion 4 is preferably provided on both surfaces, because even when mites crawl downward, the mites can be easily observed by turning over the attracting mite confirmation apparatus. Moreover, since a main object of the present invention is to observe attracted mites, it is sufficient to adhere a mite attracting agent to the mite attracting sheet 3 only below the above-described see-through portion 4, and thereby mites can be collected to a part below the see-through portion 4 and the mites can be observed relatively easily via the see-though part 4, while the mite attracting sheet 3 can be disposed across nearly the whole surface of the apparatus 1.

Figure 4:
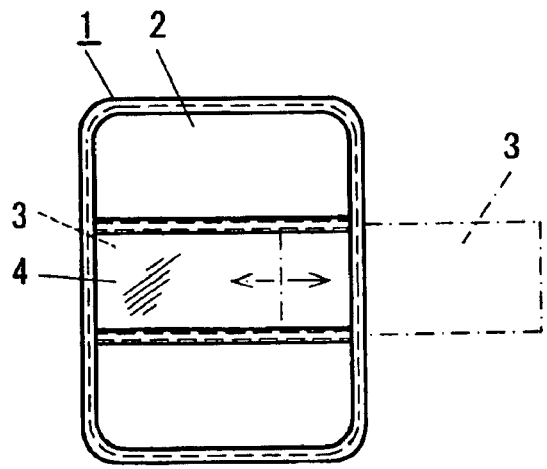
FIG. 4 shows plan views of still other embodiments of the same.

In addition, as shown in FIG. 4, the attracting sheet 3 below the see-through portion 4 of the attracting mite confirmation apparatus 1 can be attached by insertion so as to be replaceable by drawing out the same and can be periodically replaced every 1–2 months to observe mites. In this case, this can be preferably used for sample data collection, in particular.

Figure 5:
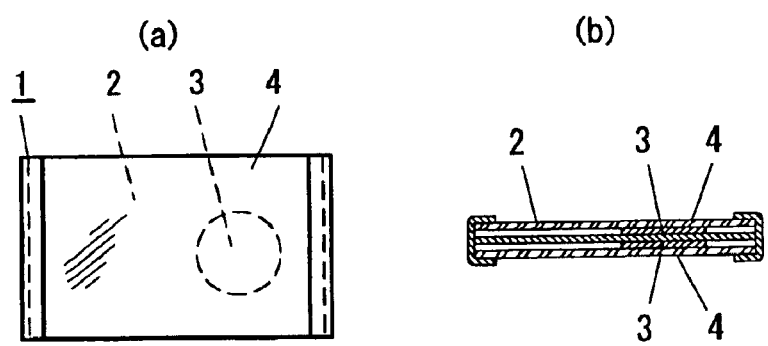
FIG. 5 shows a sectional side view (a) and a plan view (b) of still another embodiment of the same.

In addition, as shown in FIG. 5(a) and FIG. 5(b), the attracting mite confirmation apparatus 1 can be a small and thin type, which is formed by adhering a mite attracting sheet 3 to an appointed position on one surface side or both surface sides of a base 2 of a thin plastic sheet or a glass sheet.

Figure 6:
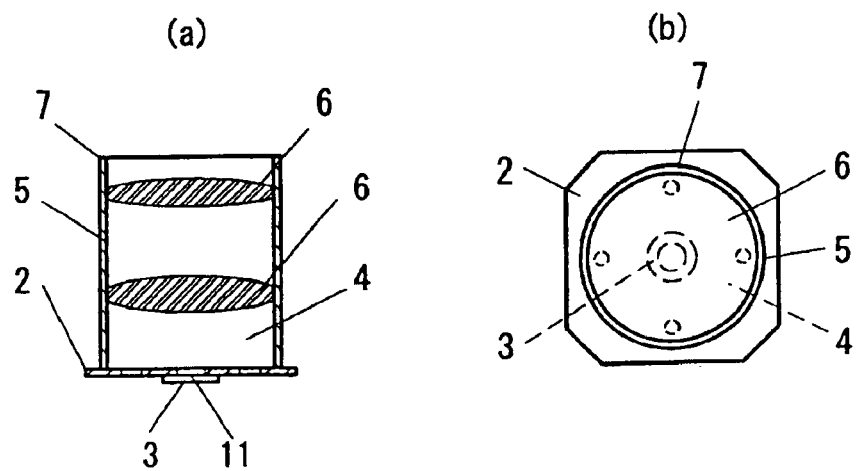
FIG. 6 shows a sectional side view (a) and a plan view (b) of still another embodiment of the same.

In addition, as shown in FIG. 6(a) and FIG. 6(b), an attracting mite confirmation apparatus 1 of the present invention can also be provided with a simple loupe 7, which is formed by providing lenses 6 of 20–50 magnifications in a plastic tube 5, and this loupe 7 can be removed for use of the attracting mite confirmation apparatus 1.

Figure 7:
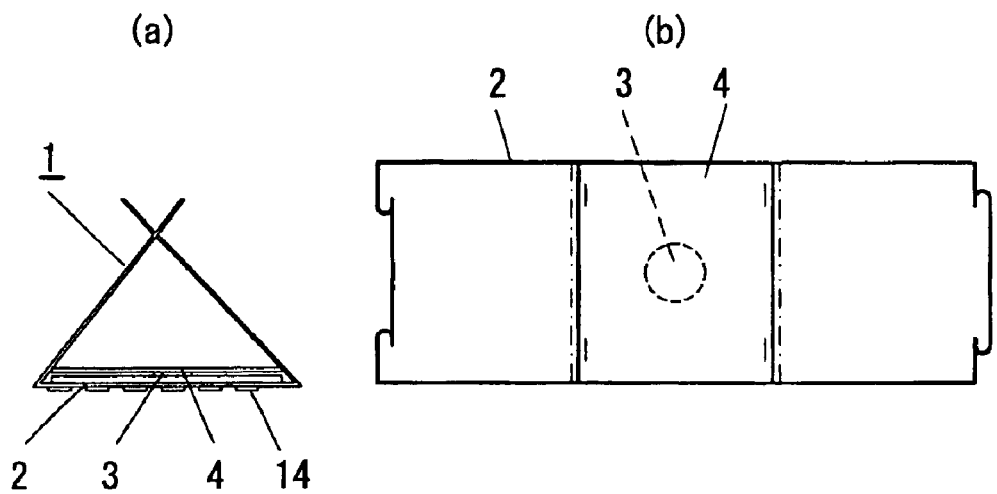
FIG. 7 shows a side view (a) and a developed view (b) of still another embodiment of the same.
Figure 8:
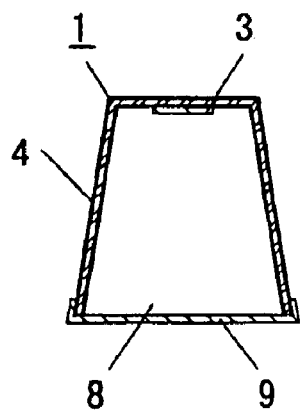
FIG. 8 shows a sectional side view of still other embodiments of the same.
Figure 9:
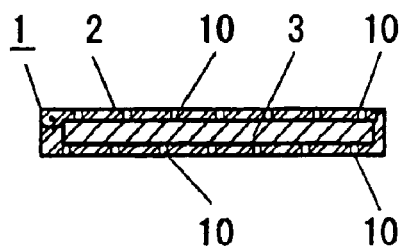
FIG. 9 shows a sectional side view of still other embodiments of the same.

In addition, although a description has been given of a sheet-like or mat-like attracting mite confirmation apparatus 1 in the above, an attracting mite confirmation apparatus 1 which is built into a house shape from a sheet material, etc., as shown in FIG. 7(a) and FIG. 7(b), a tumbler-like see-through body 4 as shown in FIG. 8, a floppy (registered trademark) case-like see-through body 4 as shown in FIG. 9, and others can also be applied on the basis of the purpose of the present invention.

In FIG. 8, a mite attracting sheet 3 is adhered to the inside of the bottom surface of a tumbler-like cylindrical see-through body 4, and a sheet cover 9 of a nonwoven fabric sheet or the like with air permeability through which mites can intrude is attached to an opening portion, and in FIG. 9, a mite attracting sheet 3 is provided in a floppy (registered trademark) case-like see-through body 4 whose both side surfaces have a great number of minute opening portions 10 opened so that mites can intrude therethrough.

Figure 10:
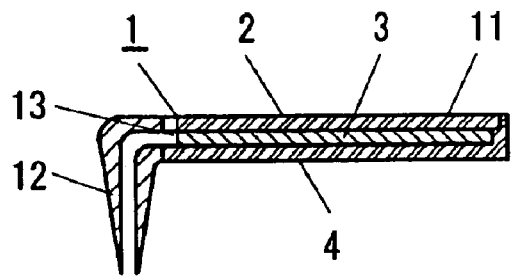
FIG. 10 shows a sectional side view of still other embodiments of the same.
Figure 11:
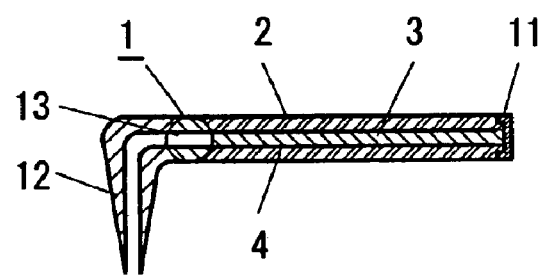
FIG. 11 shows a sectional side view of still other embodiments of the same.

Furthermore, as shown in FIG. 10 and FIG. 11, an opening and closing lid 11 can be fitted so as to be openable and closable to a thin transparent plastic case-like see-through body 4, a wide-mouthed nozzle-like mite attracting nozzle portion 12 can be provided in one end portion of this case, which can then be placed by thrusting the mite attracting nozzle portion 12 into or under a tatami-mat or carpet where a great number of mites lurk themselves. In particular, in FIG. 11, a mite attracting nozzle portion 12 is turnably fitted to a case, so that when the mite attracting nozzle portion 12 can be turned upward, a conductive hole 13 to the case is blocked and attracted mites can be captured into the case for confirmation.

In the above description, in place of the mite attracting sheet 3, an attractive mite-killing sheet to which an attractive mite-killing agent which can attract and kill mites has been applied can be fitted so as to capture and kill mites.

In FIG. 12(a) and FIG. 12(b), a cover sheet 14 on which a see-through portion 4 of a transparent synthetic resin sheet or the like is stitched or adhered is overlapped with a sheet 3 for attracting vermin such as mites and insects harmful to fabric, and a base 2 is disposed on the lower-surface side of the attracting sheet 3, and, as shown in FIG. 13(a), a slit 15, a pocket portion 16 or the like is opened in an end portion of the base 2, and a mite-killing sheet 17 or an adhesive sheet to which an insecticide mixed with an attracting agent for mites, etc., has been adhered by an application or impregnation is attached by insertion therethrough as shown in FIG. 13(b).

In this case, after mites, etc., attracted by the attracting sheet 3 can be confirmed via the see-through portion 4, the mites, etc., can be destroyed by inserting the insecticidal sheet 17 or adhesive sheet inside through the slit 15 or pocket portion 16.

Figure 14:
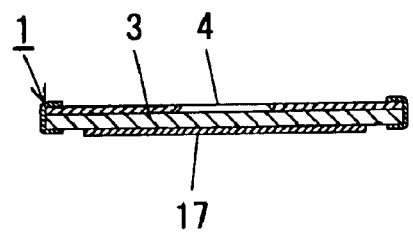
FIG. 14 is a sectional side view of still another embodiment of the same.

In addition, as shown in FIG. 14, an attractive/insecticidal sheet 17 or an adhesive sheet can be attached to the lower-surface side of the attracting sheet 3 by a stopper means such as an adhesive tape, a snap fastener, a button or the like, so that vermin such as mites are attracted from both sides of the upper attracting sheet 3 and lower attractive/insecticidal sheet 17 and destroyed.

A variety of known mites are commonly detected in homes, including house dust mites, dermatophagoide farinaes, epidermoptidaes, oribatid mites, acarids, cheyletidaes, dust mites, tarsonemidaes, house mites, and the like.

House dust mites feed on mold, plant fiber, waste materials containing unsaturated fatty acids, food scraps, etc., oribatid mites feed on mold and humus, acarids are food parasites that prefer cheese and food scraps, cheyletidaes live by predating the above-mentioned dust mites and oribatid mites and other minute insects, dust mites feed on food scraps, and especially dried and sun-dried seafood and pet food, tarsonemidaes live on dust and stored food, and house mites are parasitic on rats and birds.

Since, in houses, etc., the above-described vermin inhabit close to floor surfaces in carpets, tatami-mats, etc., and in bedding including futons and beds, interior fabric items, fabric chairs/sofas, spaces between walls and furniture and the like in great numbers, sheet-like, mat-like attracting mite confirmation apparatuses 1 can be placed in the mite habitats or close thereto so that mites can be attracted.

As the aforementioned non-toxic feeding attractant substances there are preferred food flavors such as dry beer yeast and the like, chocolate or cocoa powder, cheese, butter, biscuits, grain powder, rice malt, fiber scrap or pet food, either alone or in appropriate combinations, formulated to attract the aforementioned different types of mites.

As non-toxic aromatic attractants there are preferred animal and vegetable oils and fats, their esters with fatty acids, for example, salad oil, sesame oil, frying oil, ester-based food aroma additives such as geranyl, and esters of acetic acid, butyric acid and alcohols, either alone or in appropriate combinations, formulated to attract the aforementioned different types of mites. In addition there may be added attractants such as pheromones, as well as negative ion-releasing ceramics purified from rare earth alloys and tourmaline, in order to attract and kill the widest range of mite types. As non-toxic miticidal substances there may be used porous substances such as silica gel, active carbon, zeolite and calcium chloride, moisture-absorbing substances or adsorption heat generating substances, either alone or in appropriate combinations.

Herein, in the case of an attractive mite-killing sheet, a non-toxic mite-killing substance can be mixed in the above so that mites can be captured and destroyed.

Embodiment

FIG. 1(a) and FIG. 1(b) show an embodiment of the present invention, wherein an attracting mite confirmation apparatus 1 is formed by: depositing, on the upper surface and lower surface of a mat-like base 2 of a 15 cm×18 cm-sized fabric, mite attracting sheets 3 of black-colored nonwoven fabric sheets to which the above-described mixture of fine powder of a non-toxic dietary attractive substance and an odorous attractive agent with a water-base paint mixed has been applied; depositing thereon see-through portions 4 of transparent film sheets, respectively; and stitching circumferential portions thereof.

The above-described attracting mite confirmation apparatus 1 is placed in a dark place or a place which cannot be completely cleaned, such as between a bed and its mattress, on a carpet or tatami-mat, or under a desk in a house, and observation is carried out. In observation, by thoroughly observing the see-through portions 4 by use of a loupe of 20 magnification or more, a microscope of 50 magnification or more, another microscope or the like, minute white insect-like objects moving about therein can be observed. In particular, mites can be easily confirmed since the mite attracting sheet 3 below the see-through portion 4 is black. In addition, by providing the see-through portions 4 on both sides, even when mites hide downward, the mites can be easily observed by turning over the attracting mite confirmation apparatus.

FIG. 2(a), FIG. 2(b), and FIG. 3 show other embodiments of the present invention, wherein one or a plurality of circular or rectangular see-through portions 4 are provided. As such, a required number of see-through portion(s) 4 of a required shape can be provided on one surface or both surfaces, and as shown in FIG. 2(b) and FIG. 3, different mite attracting agents can be applied to a plurality of see-through portions 4 so that various types of attracted mites can be confirmed.

FIG. 4 shows still another embodiment of the present invention, wherein both side portions of a see-through portion 4 are stitched on a base 2, and a mite attracting sheet 3 is fitted so as to be insertable and removable between the base 2 and see-through portion 4. In the present embodiment, only the small-sized mite attracting sheet 3 portion can be replaced for use of the apparatus.

FIG. 5(a) and FIG. 5(b) show still another embodiment of the present invention, wherein to both surfaces of a base 2 of a 6 cm×8 cm-sized thin plastic sheet, 2 cm-diameter mite attracting sheets 3 with the above-described mite attracting agent adhered are respectively adhered, and to the surfaces thereof, see-through portions of a 6 cm×8 cm-sized transparent plastic sheets are respectively adhered with side end portions thereof fixed. In the present embodiment, since the apparatus is extremely small and thin, it can be inserted into a minute gap between chests or between a chest and a wall surface, under a carpet, and other places for use, and mites can be confirmed from both front and rear surfaces. In addition, in FIG. 6(*a*) and FIG. 6(*b*), the central part of a base 2 of a several-centimeter-square plastic sheet is opened, and around the bottom opening portion 11, a mite attracting sheet 3 to which a mite attracting agent has been applied is adhered, and to the upper surface of the base 2, a loupe 7 of 20 magnification is attached. In the present embodiment, mites can be attracted and the mites can be promptly confirmed via the loupe.

In addition, in FIG. 7, a base 2 of a paper sheet is folded up and built into a house shape of an approximately matchbox size, wherein on the central part of this base 2, a mite attracting sheet of a nonwoven fabric sheet to which a mite attracting agent has been applied is deposited, and to the upper surface thereof, one side part of a see-through portion 4 of a transparent vinyl sheet is attached, and this one-side part is attached so that the see-through portion 4 is openable and closable. Moreover, an adhesive body 14 is adhered to the above-described bottom surface so that the apparatus can be placed by being adhered to a floor surface or the like. In the present invention, the apparatus can be adhered to a required point of the floor face or the like for placement, and attracted mites can be observed by extending the house-like attracting mite confirmation apparatus.

Furthermore, in FIG. 8, a mite attracting sheet 3 is adhered to the inside of the bottom surface of a transparent glass tumbler-like cylindrical see-through body 4, and a sheet cover 9 of a nonwoven fabric sheet is attached to an opening portion 8, and as illustrated, the see-through body 4 is placed in an inverted manner. In the present embodiment, attracted mites can be observed in an unchanged condition.

Moreover, in FIG. 9, in both side surfaces of an openable and closable transparent floppy (registered trademark) case-like thin see-through portion 4, minute opening portions 10 are opened in large numbers, and a mite attracting sheet 3 is provided in the thin see-through body 4. In the present embodiment, by providing the see-through portions 4 on both surfaces, attracted mites can be confirmed from both-surface sides of the see-through portion 4.

Furthermore, in FIG. 10 and FIG. 11, respectively, to a base 2 or see-through portion 4 which also serves as a thin plastic case, an opening and closing lid 11 is fitted so as to be openable and closable, and in one end portion of this case, a wide-mouthed nozzle-like mite attracting nozzle portion 12 is provided, so that the apparatus can be placed in a manner thrust into or under a tatami-mat or into or under a carpet. In the present invention, attracted mites can be captured and confirmed in the case.

Figure 12:
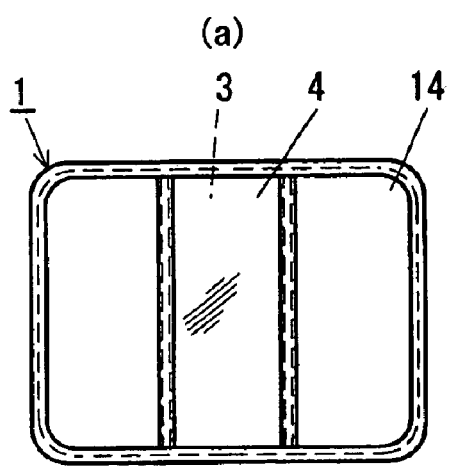
FIG. 12 shows a plan view (a) and a sectional side view (b) of still other embodiments of the same.
Figure 12:
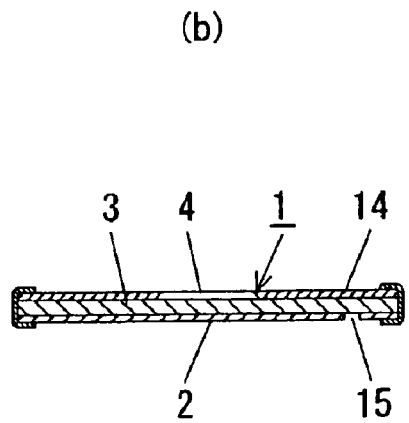
Figure 13:
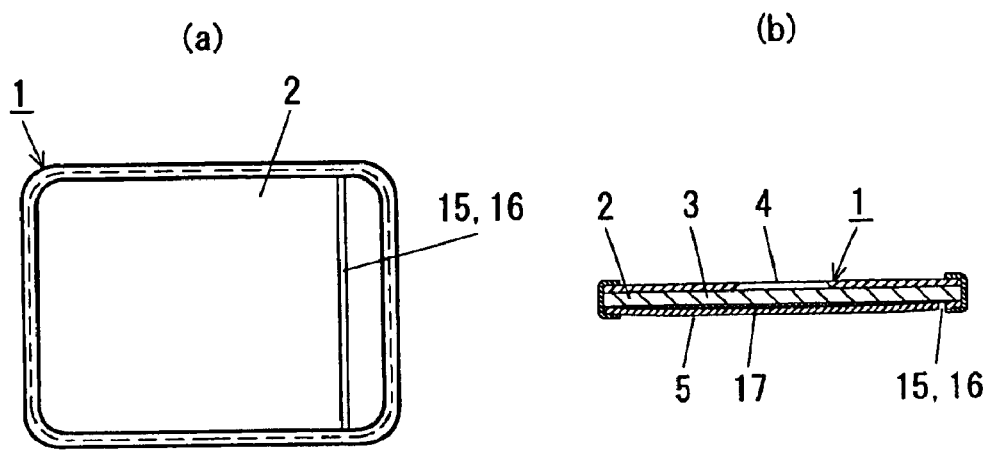
FIG. 13 shows a rear view (a) and a sectional side view (b) in use of the same.

Furthermore, in FIG. 12(*a*) and FIG. 12(*b*), on an 80 mm×60 mm-sized attracting sheet 3 for mites and insects harmful to fabric, a 5 mm-high cover sheet 14 on which a see-through potion 4 of a transparent synthetic resin sheet has been stitched is overlapped, on the lower-surface side of the attracting sheet 3, a base 2 is disposed, and as shown in FIG. 13(*a*), a slit 15 is opened in an end portion or the like of the base 2 so that an insecticidal sheet 17 to which an insecticide mixed with an attracting agent has been uniformly applied is attached by insertion therethrough as shown in FIG. 13(*b*).

In this case, since the apparatus is small and thin, it can be easily placed at any place such as a narrow place, and after mites, etc., attracted by the attracting sheet 3 can be confirmed via the see-through portion 4, the mites, etc., can be captured and destroyed by inserting the insecticidal sheet 17 or adhesive sheet inside through the slit 15.

Moreover, as shown in FIG. 14, to the lower-surface side of an attracting sheet 3, an attractive insecticidal sheet 17 or an adhesive sheet is attached by a stopper means such as an adhesive tape so that mites, etc., are attracted from both sides of the upper attracting sheet 3 and lower attractive/insecticidal sheet 17 and destroyed. In this case, mites, etc., can be attracted and captured from both upper-surface and lower-surface sides and be destroyed.

When the apparatuses of these embodiments are used, by covering and shading them with a dark sheet or the like, mites, etc., are easily attracted, and the above-described base and case can be made to attract mites, etc., by an attachment of the attracting sheet 3, and the apparatuses can also be used so as to capture and destroy mites, etc., by an attachment of an attractive insecticidal sheet in which an attractive insecticide which can destroy mites, etc., has been mixed.

What is claimed is:

1. An attracting mite confirmation apparatus comprising:
   a see-through portion for confirming mites attracted to a mite attracting sheet for attracting the mites, the mite attracting sheet being permeable, thus allowing the mites to intrude into the mite attracting sheet,
   wherein the mite attracting sheet is a fabric, a paper or a nonwoven fabric mite attracting thin sheet to which a powdered attractant of a non-toxic feeding attractant is applied, and/or to which a non-toxic aromatic attractant is laminated on the surface of a thin plastic or a thin paper base sheet,
   a transparent plastic thin sheet or a transparent film thin sheet being disposed in an overlapping manner with the surface of the mite attracting sheet for confirming the mites, and
   the attracted mites in a captured condition between the mite attracting sheet and the transparent sheet by the mite attracting sheet being confirmed or observed via a see-through portion of the transparent plastic thin sheet or the transparent film thin sheet for confirming the mites.

2. The attracting mite confirmation apparatus as set forth in claim 1, wherein a see-through portion of a transparent sheet is overlapped with the mite attracting sheet, and the mite attracting sheet has an opposite color to a body color of mites, such as black, brown, dark blue so that attracted mites can be easily confirmed.

3. The attracting mite confirmation apparatus as set forth in claim 1 or 2, wherein a see-through portion of a transparent sheet is overlapped on both surface sides of the mite attracting sheet.

4. The attracting mite confirmation apparatus as set forth in claim 1, wherein the mite attracting sheet is replaceably fitted to a base sheet.

5. The attracting mite confirmation apparatus as set forth in claim 1, wherein a loupe with predetermined magnifying properties is fitted to an upper part of the see-through portion of a see-through window so that the attracted mites can be observed by a naked eye.

6. The attracting mite confirmation apparatus as set forth claim 1, wherein by fitting an attractive mite-killing sheet to which an attractive mite-killing agent for attracting and capturing the mites has been applied is fitted so as to be replaceable with a mite attracting sheet, the attracted mites can be confirmed and captured.

7. An attracting mite confirmation apparatus in which by adhering a mite attracting sheet for attracting mites to a see-through body of a transparent cylindrical body or thin case having an opening through which the mites can intrude, or by providing the same inside, the mites attracted to the mite attracting sheet can be confirmed via the see-through body of the transparent cylindrical body or the thin case, wherein the mite attracting sheet is formed of a permeable material, thus allowing mites to intrude into the mite attracting sheet and wherein the mite attracting sheet is a fabric, a paper or a nonwoven fabric mite attracting thin sheet to which a powdered attractant of a non-toxic feeding attractant is applied, and/or to which a non-toxic aromatic attractant is laminated on the surface of a thin plastic or a thin paper base sheet, a transparent plastic thin sheet or a transparent film thin sheet being disposed in an overlapping manner with the surface of the mite attracting sheet for confirming the mites, and the attracted mites in a captured condition between the mite attracting sheet and the transparent sheet by the mite attracting sheet being confirmed or observed via a see-through portion of the transparent plastic thin sheet or the transparent film thin sheet for confirming the mites.

8. An attracting vermin capturing method comprising the steps of:

providing a see-through portion of a mite attracting and confirmation apparatus for confirming mites, attracted to an attracting sheet for attracting the mites; and attracting the mites to the attracting sheet, the attracting sheet being permeable, thus allowing the mites to intrude into the attracting sheet;

confirming the attracted mites via the see-through portion;

applying an attractive insecticidal to the attracting sheet for capturing and destroying the mites;

fitting the attracting sheet to which the attractive insecticidal has been applied to the mite attracting and confirmation apparatus, thereby capturing and destroying the mites, overlapping the attracting sheet for attracting the mites with a base sheet;

providing a slit or a pocket opening in the base sheet;

inserting the attractive insecticidal sheet through the slit or the pocket opening; and fitting the attractive insecticidal sheet between the attracting sheet and base sheet.

9. The attracting mite capturing method as set forth in claim 8, further comprising the step of:

attaching the attractive insecticidal sheet to the lower-surface side of the attracting sheet for attracting the mites by a stopper means such as an adhesive tape or a snap fastener.

10. The attracting mite confirmation apparatus as set forth in claim 1, wherein the mite attracting sheet is a fabric, a paper or a nonwoven fabric mite attracting sheet to which a powdered attractant, of a non-toxic feeding attractant is applied and/or to which a non-toxic aromatic attractant is laminated on the surface of a fabric, a paper or a nonwoven fabric base sheet which has air permeability, the mites entering and moving around in the mite attracting sheet, a transparent plastic sheet or a transparent film sheet being disposed in an overlapping manner with the surface of the mite attracting sheet for confirming the mites, and the attracted mites in a captures condition between the mite attracting sheet and the transparent sheet by the mite attracting sheet being confirmed or observed via a see-through portion of the transparent plastic sheet or the transparent film sheet.

11. The attracting mite confirmation apparatus as set forth in claim 10, wherein a mite attracting agent for attracting mites is only applied to the attracting mite sheet in a position below the see-through portion.

12. The attracting mite confirmation apparatus as set forth in claim 1, wherein a mite attracting agent for attracting mites is only applied to the attracting mite sheet in a position below the see-through portion.

13. The attracting mite capturing method as set forth in claim 8, wherein the mite attracting sheet is fabric, a paper or a nonwoven fabric mite attracting sheet to which a powdered attractant of a non-toxic feeding is applied and/or to which a non-toxic aromatic attractant is laminated on the surface of a fabric, a nonwoven fabric or a plastic base sheet which has air permeability, the mites entering and moving around in the mite attracting sheet, a transparent plastic sheet or a transparent film sheet being disposed in an overlapping manner with the surface of the mite attracting sheet for confirming confirming the mites, the see-through portion for confirming mites attracted by the mite attracting sheet being between the mite attracting sheet and the transparent sheet for attracting mites, wherein after confirming the mites via the see-through plastic portion of the transparent plastic sheet or the transparent film sheet, the method further comprising the step of:

fitting an attractive mite-killing sheet to which an attractive mite-killing agent to capture and destroy the mites has been applied to the mite attracting and confirmation apparatus, thereby capturing and destroying the mites.

14. The attracting mite capturing method as set forth in claim 13, wherein the attracting sheet for attracting mites is overlapped with a base sheet;

a slit or a pocket opening is provided in the base sheet; and attractive mite-killing sheet is inserted through the slit or the pocket opening and is fitted between the attracting sheet and base sheet.

15. The attracting mite confirmation apparatus as set forth in claim 1, wherein the mite confirmation apparatus is a closed container, except for having at least one air permeable surface through which the mites enter the mite confirmation apparatus.

16. The attracting mite confirmation apparatus as set forth in claim 7, wherein the mite confirmation apparatus is a closed container, except for having at least one air permeable surface through which the mites enter the mite confirmation apparatus.

17. The attracting mite capturing method as set forth in claim 8, wherein the attracting mite confirmation apparatus is a closed container, except for having at least one air permeable surface through which the mite enter the attracting mite confirmation apparatus.

18. An attracting vermin capturing method comprising the steps of:

providing a see-through portion of a mite attracting and confirmation apparatus for confirming mites, attracted to an attracting sheet for attracting the mites; and attracting the mites to the attracting sheet, the attracting sheet being permeable, thus allowing the mites to intrude into the attracting sheet;

confirming the attracted mites via the see-through portion;

applying an attractive insecticidal to the attracting sheet for capturing and destroying the mites; and fitting the attracting sheet to which the attractive insecticidal has been applied to the mite attracting and confirmation apparatus, thereby capturing and destroying the mites, wherein the mite attracting sheet is fabric, a paper or a nonwoven fabric mite attracting sheet to which: a powdered attractant of a non-toxic feeding is applied and/or to which a non-toxic aromatic attractant is laminated on the surface of a fabric, a nonwoven fabric or a plastic base sheet which has air permeability, the mites entering and moving around in the mite attracting sheet, a transparent plastic sheet or a transparent film sheet being disposed in an overlapping manner with the surface of the mite attracting sheet for confirming the mites, the see-through portion for confirming mites attracted by the mite attracting sheet being between the mite attracting sheet and the transparent sheet for attracting mites, wherein after confirming the mites via the see-through plastic portion of the transparent plastic sheet or the transparent film sheet, the method further comprising the step of:

fitting an attractive mite-killing sheet to which an attractive mite-killing agent to capture and destroy the mites has been applied to the mite attracting and confirmation apparatus, thereby capturing and destroying the mites.

* * * * *